US007466352B2

United States Patent
Nakajima

(10) Patent No.: US 7,466,352 B2
(45) Date of Patent: Dec. 16, 2008

(54) GAMMA CORRECTION DEVICE IN IMAGE CAPTURING APPARATUS

(75) Inventor: Fumio Nakajima, Kanagawa (JP)

(73) Assignee: Sony Corporation (JP)

( * ) Notice: Subject to any disclaimer, the term of this patent is extended or adjusted under 35 U.S.C. 154(b) by 715 days.

(21) Appl. No.: 10/810,599

(22) Filed: Mar. 29, 2004

(65) Prior Publication Data
US 2004/0196394 A1    Oct. 7, 2004

(30) Foreign Application Priority Data
Apr. 4, 2003    (JP) .......................... P2003-101787

(51) Int. Cl.
*H04N 5/202* (2006.01)
*H04N 9/64* (2006.01)

(52) U.S. Cl. ...................... 348/254; 348/251
(58) Field of Classification Search ................ 348/251, 348/254–256; 382/169, 237
See application file for complete search history.

(56) References Cited

U.S. PATENT DOCUMENTS

| 5,164,993 | A | * | 11/1992 | Capozzi et al. | ............. 382/132 |
| 5,708,729 | A | * | 1/1998 | Adams et al. | ............... 382/169 |
| 5,710,827 | A | * | 1/1998 | Perumal et al. | ............. 382/167 |
| 6,404,512 | B1 | * | 6/2002 | Tone | ......................... 358/3.01 |
| 6,876,382 | B1 | * | 4/2005 | Sakamoto | ................. 348/207.2 |
| 7,088,390 | B2 | * | 8/2006 | Mori et al. | ................... 348/254 |
| 2002/0061142 | A1 | * | 5/2002 | Hiramatsu | ................... 382/254 |
| 2002/0067414 | A1 | * | 6/2002 | Tanji et al. | ................... 348/254 |

FOREIGN PATENT DOCUMENTS

| JP | 1990-219370 | 8/1990 |
| JP | 1996-242393 | 9/1996 |
| JP | 1999-018104 | 1/1999 |
| JP | 2001-285706 | 10/2001 |
| JP | 2001-346218 | 12/2001 |

OTHER PUBLICATIONS

Charles Poynton, "A Technical Introduction to Digital Video", 1996, John Wiley & Sons, Chapter 6, pp. 91-114.*

* cited by examiner

*Primary Examiner*—Ngoc-Yen T Vu
*Assistant Examiner*—Albert H Cutler
(74) *Attorney, Agent, or Firm*—Rader Fishman & Grauer PLLC; Ronald P. Kananen

(57) ABSTRACT

A gamma correction device performs gamma correction on an input signal from an image capturing element based on at least one correction curve having a predetermined input-output characteristic in an image capturing apparatus. The correction curve is composed of a logarithmic curve whose slope at the origin is 5.0 or less or a composite of a curve segment lying from the origin to a predetermined level of an input signal complying with the ITU-709 standard and a logarithmic curve segment lying above the predetermined level of the input signal, wherein both curve segments are continuously combined and have the same slope at the predetermined level.

12 Claims, 4 Drawing Sheets

GAMMA CORRECTION DEVICE IN IMAGE CAPTURING APPARATUS

BACKGROUND OF THE INVENTION

1. Field of the Invention

The present invention relates to gamma correction devices in image capturing apparatuses and, in particular, to a gamma correction device in an image capturing apparatus for correcting a video signal from an image capturing element on the basis of at least one correction curve having a predetermined input-output characteristic.

2. Description of the Related Art

In movies, traditionally, film-based cameras have been used for shooting in most cases. In order to view actual images captured with a film-based camera, it is necessary to develop the captured film and project the developed film by passing light therethrough.

In recent years, digital-based movies captured with digital video cameras have emerged, replacing film-based movies. Using the digital video cameras permits recorded images to be read immediately and to be viewed on monitors at shooting sites. In general, the monitors are optimized by curves complying with the ITU-709 standard (hereinafter referred to as an ITU-709 characteristic curve).

In digital video cameras, generally, signals having 600% or higher dynamic range output from image capturing elements consisting of charge coupled devices (CCDs) are compressed into signals having 200% to 250% dynamic range by pre-knee correction. The compressed signals are subjected to analog-to-digital conversion and 10-bit assignment. Because of 1 Vp-p constraints, the real video signals are compressed in the digital video cameras having CCDs from 600% or higher dynamic range to about 100% to 120% and then subjected to gamma correction (see, for example, Japanese Unexamined Patent Application Publication No. 5-336406).

However, since a 100% or higher dynamic range of the video signals output from the image capturing elements of the digital video cameras is significantly compressed by pre-knee correction, the gamma correction based on the conventional ITU-709 characteristic curve results in output video signals including hardly any information contained in the 100% or higher dynamic range. As a result, digital-based images captured with digital video cameras differ from film-based images captured with film-based cameras and having wide dynamic range. Moviemakers notice the difference in shades of gray and color tone between the film-based images and the digital-based images, and thus determine that the digital-based images cannot provide shades of gray and color tone to a quality equivalent to the film-based images. As a consequence, moviemaking by the digital video cameras has not yet been very popular.

Applying a logarithmic curve by which a signal is corrected so as to conform to film properties as a correction curve permits the images to include information contained in a range exceeding 100%. In this case, the slope of the rising logarithmic curve at the origin (where a level of an input signal is zero) is significantly steep, compared to applying the ITU-709 characteristic curve (having the slope of approximately 4.5 at the origin) as the correction curve. Using a conventional monitor optimized on the basis of the ITU-709 characteristic curve causes images corrected by the logarithmic curve to have a significantly isolated black component and thus the displayed images are different from the real images. Since monitors optimized on the basis of the logarithmic curve would incur high cost, it has been desired that images with a quality equivalent to film-based images be displayed even on conventional monitors.

SUMMARY OF THE INVENTION

Accordingly, it is an object of the present invention to provide a gamma correction device in a novel and improved image capturing apparatus capable of displaying an image with a quality equivalent to a film-based image, having no isolated black component, and including information contained in a range exceeding 100%.

To solve the problems described above, according to a first aspect, the present invention provides a gamma correction device in an image capturing apparatus, the gamma correction device performing gamma correction on a video signal from an image capturing element on the basis of at least one correction curve having a predetermined input-output characteristic, wherein the at least one correction curve has a slope of 5.0 or less at the origin such that a corrected video signal conforms to film properties.

According to the first aspect of the present invention, the correction curve (e.g. a logarithmic curve) having the gentle slope and allowing the corrected signal to conform to film properties is assigned to the lower-level range of an input signal (the range near the origin) so that images having no isolated black component and appearing normal to the viewer are displayed even on a conventional monitor. The logarithmic curve rises gently in the range exceeding 100%, and thus, displayed images include information contained in the range exceeding 100% and have a quality equivalent to film-based images. The logarithmic curve may be designed depending on the extent to which information can be included in the range exceeding 100% (e.g. 108%). A sensitivity of 100% is set at a reflectance of 89.9% when a white region of a gray-scale master is irradiated with a predetermined intensity (e.g. 2000 lux).

The slope of the at least one correction curve at the origin may be settable based on various conditions. As a result, a suitable correction curve may be used in the lower-level range of the input signal in accordance with, for example, the state of the black component.

In the gamma correction device of the image capturing apparatus, the at least one correction curve may have a plurality of correction curves having different slopes and being selectable based on various conditions. Therefore, a suitable correction curve may be selected from the plurality of correction curves stored in a predetermined storage device. As a result, adjustment of, for example, the state of the black component in the lower-level range of the input signal may be carried out simply and suitably in accordance with the user's taste.

To solve the problems described above, according to a second aspect, the present invention provides a gamma correction device in an image capturing apparatus, the gamma correction device performing gamma correction on a video signal from an image capturing element on the basis of at least one correction curve having a predetermined input-output characteristic, wherein the at least one correction curve is composed of a composite of a correction curve segment lying from the origin to a predetermined level of an input signal such that a corrected video signal conforms to a cathode-ray tube monitor and another correction curve segment lying above the predetermined level of the input signal such that the corrected video signal conforms to film properties, and both correction curve segments are continuously combined and have the same slope at the predetermined level of the input signal.

According to the second aspect of the present invention, the correction curve segment (e.g. an ITU-709 characteristic curve segment) by which the signal is corrected so as to conform to a cathode-ray tube monitor is assigned to the lower-level range of an input signal (the range near the origin) so that suitable images having no isolated black component and appearing normal to the viewer are displayed even on a conventional monitor. The correction curve segment (e.g. a logarithmic curve segment) having a significantly gentle slope in the range exceeding 100% and allowing the corrected signal to conform to film properties is assigned to the higher-level range of the input signal, and thus, displayed images include information contained in the range exceeding 100% and have a quality equivalent to film-based images. The logarithmic curve may be designed depending on the extent to which information can be included in the range exceeding 100% (e.g. 108%).

The predetermined level of the input signal may be settable based on various conditions. Therefore, the user is able to select which range of the signal is emphasized, the lower or the higher one, by setting the predetermined level of the input signal. Specifically, the length of the correction curve segment (e.g. the logarithmic curve segment) by which the signal is corrected so as to conform to film properties increases with a decrease in the level where the correction curve is shifted from the correction curve segment (e.g. an ITU-709 characteristic curve segment) by which the signal is corrected so as to conform to a cathode-ray tube monitor to the other correction curve segment (e.g. a logarithmic curve segment) by which the signal is corrected so as to conform to film properties, thus increasing the amount of included information. This means that the higher-level range is emphasized. By contrast, the length of the correction curve segment (e.g. the ITU-709 characteristic curve segment) by which the signal is corrected so as to conform to a cathode-ray tube monitor increases with an increase in the level where the correction curve is shifted. This means that the lower-level range is emphasized.

In the gamma correction device of the image capturing apparatus, the at least one correction curve may have a plurality of correction curves having different predetermined levels of the input signals and being selectable based on various conditions. Therefore, a suitable correction curve may be selected from the plurality of correction curves stored in a predetermined storage device. As a result, the correction curve in which the lower level or the higher level is emphasized in accordance with the user's taste may be selected simply and readily.

DESCRIPTION OF THE PREFERRED EMBODIMENTS

Figure 1:
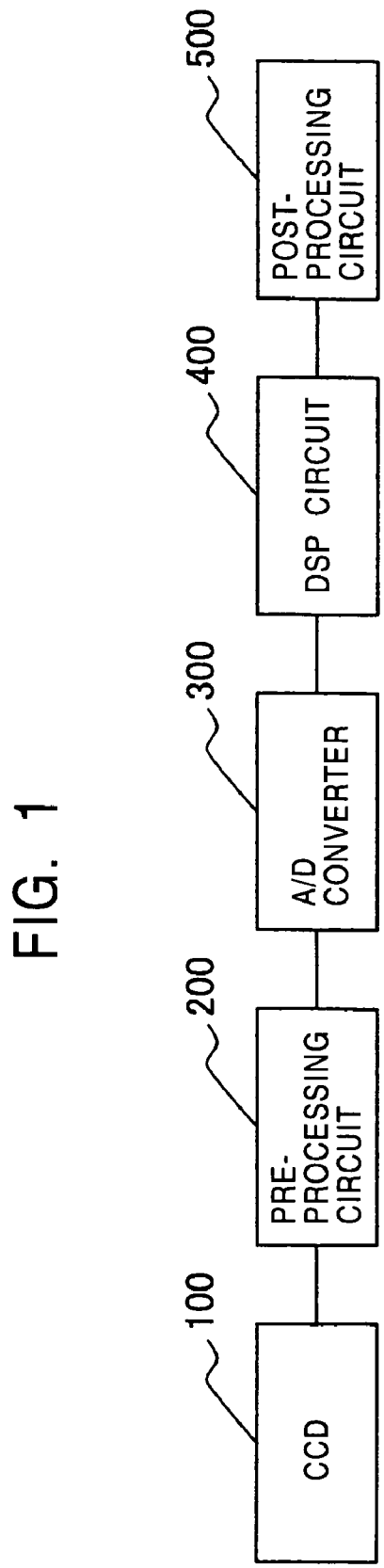
FIG. 1 is a block diagram of the schematic structure of a digital video camera according to an embodiment of the present invention.

The preferred embodiments of the present invention will now be described below with reference to the drawings. In the specification and the drawings, elements having substantially the same functionality are labeled with the same reference numerals in order to avoid redundant explanation.

First Embodiment

Based on FIG. 1, a circuit structure of an image capturing apparatus 10 (hereinafter referred to as a digital video camera 10) of the embodiment will be described. FIG. 1 is a block diagram of the circuit structure of the digital video camera 10 of the embodiment.

As shown in FIG. 1, the digital video camera 10 is composed of a CCD 100 that converts light from a subject into an electrical signal, a pre-processing circuit 200 that performs predetermined pre-processing on a video signal from the CCD 100, an A/D converter 300 that converts the analog video signal pre-processed by the pre-processing circuit 200 into a digital video signal, a digital signal processing (DSP) circuit 400 that performs signal processing, such as gamma correction, knee correction, or white clipping, on the digital video signal from the A/D converter 300, and a post-processing circuit 500 that performs post-processing on a low level signal from the DSP circuit 400.

The pre-processing circuit 200 is composed of a pre-amplifier (not shown) that samples and holds a video signal from the CCD 100 and a video amplification circuit (not shown) that adjusts the white balance and the black balance, increases gain, and performs shading correction and pre-knee correction on an analog video signal from the pre-amplifier.

The A/D converter 300 converts an analog video signal whose dynamic range is compressed to, for example, 200% to 250% by the pre-processing circuit 200 to a digital video signal. The A/D converter 300 assigns 12 bits to the video signal when the video signal is converted from analog to digital form. The digital video signal is supplied to the DSP circuit 400.

The DSP circuit 400 performs gamma correction based on correction curve data, knee correction that compresses the white component, white clipping that clips the white component, and the like, on the digital video signal from the A/D converter 300. The dynamic range of the digital video signal is finally compressed to 100% to 120%.

The gamma correction according to this embodiment is based on a correction curve (hereinafter referred to as a gently rising logarithmic curve) composed of a logarithmic curve whose slope at the origin is 5.0 or less or a correction curve (hereinafter referred to as an ITU-709 logarithmic curve) which is a composite of a curve segment based on the ITU-709 standard lying from the origin to a predetermined level of an input signal and a logarithmic curve segment lying above the predetermined level of the input signal. Both curve segments of the composite are combined continuously and have the same slope at the predetermined level of the input signal. The correction curve according to the embodiment will be described later.

The post-processing circuit 500 is composed of an encoder (not shown) that converts a supplied digital video signal to the NTSC system, a D/A converter (not shown) that converts the digital video signal from the encoder into an analog video signal, and the like.

In the digital video camera 10 having the structure described above, a video signal from the CCD 100 is subjected to various analog correction, such as the white balance processing, by the pre-processing circuit 200. The analog video signal is then converted to a digital video signal by the A/D converter 300 and supplied to the DSP circuit 400. In the DSP circuit 400, the digital video signal is gamma corrected based on the correction curve composed of the gently rising logarithmic curve or the ITU-709 logarithmic curve. The corrected digital video signal is output to the outside as a composite video signal including a luminance signal component and a color signal component under the NTSC system via the post-processing circuit 500.

Unlike the conventional correction, the DSP circuit 400 performs gamma correction based on the gently rising logarithmic curve or the ITU-709 logarithmic curve in the embodiment.

If an image captured with the digital video camera is gamma corrected based on the ITU-709 characteristic curve, information contained in the range of 100% or higher is hardly included. Applying a logarithmic curve whose slope is significantly gentle in the higher-level range of an input signal permits information contained in the range exceeding 100% to be included. In this case, however, the slope of this logarithmic curve at the origin (where the level of an input signal is zero) is significantly steep so that an image displayed on a conventional monitor disadvantageously has an isolated black component. A sensitivity of 100% is set at a reflectance of 89.9% when a white region of a grayscale master is irradiated with a predetermined intensity (e.g. 2000 lux).

Figure 2:
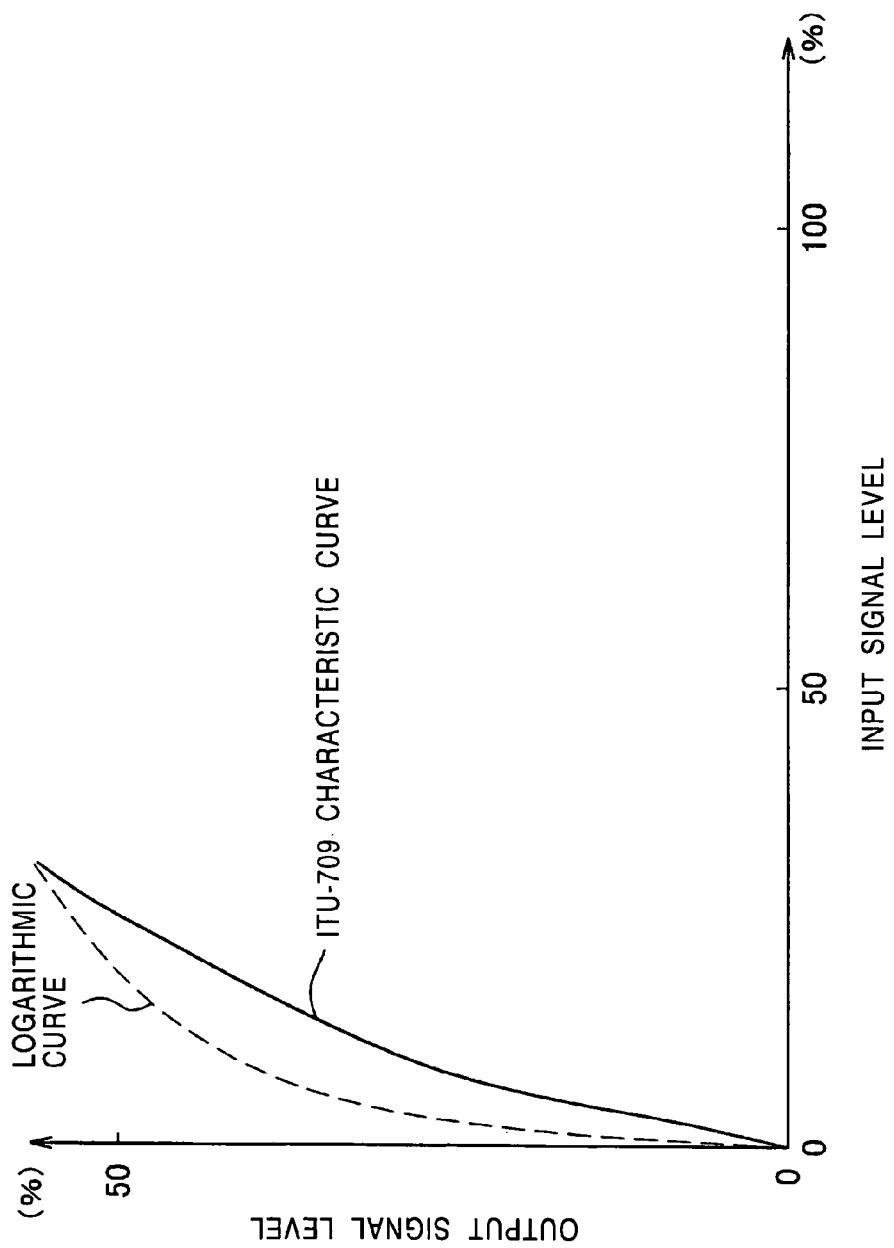
FIG. 2 shows the difference in steepness of the slope at the origin between a logarithmic curve and an ITU-709 characteristic curve.

FIG. 2 shows a comparison of the slopes of the correction curves at the origin (where the level of an input signal is zero) between the ITU-709 characteristic curve and the logarithmic curve. As shown in FIG. 2, the slope of the logarithmic curve at the origin is significantly steep compared to that of the ITU-709 characteristic curve. Therefore, when an image gamma corrected based on a correction curve composed of the logarithmic curve is monitored on a conventional monitor, the displayed image has a significantly isolated black component.

In order to achieve displayed images with a quality equivalent to film-based images while having no isolated black component and including information contained in the range exceeding 100%, a curve having a gentle slope is assigned to the lower-level range of a signal (the range near the origin) and a logarithmic curve is assigned to the higher-level range of a signal in the correction curve according to the embodiment.

Figure 3:
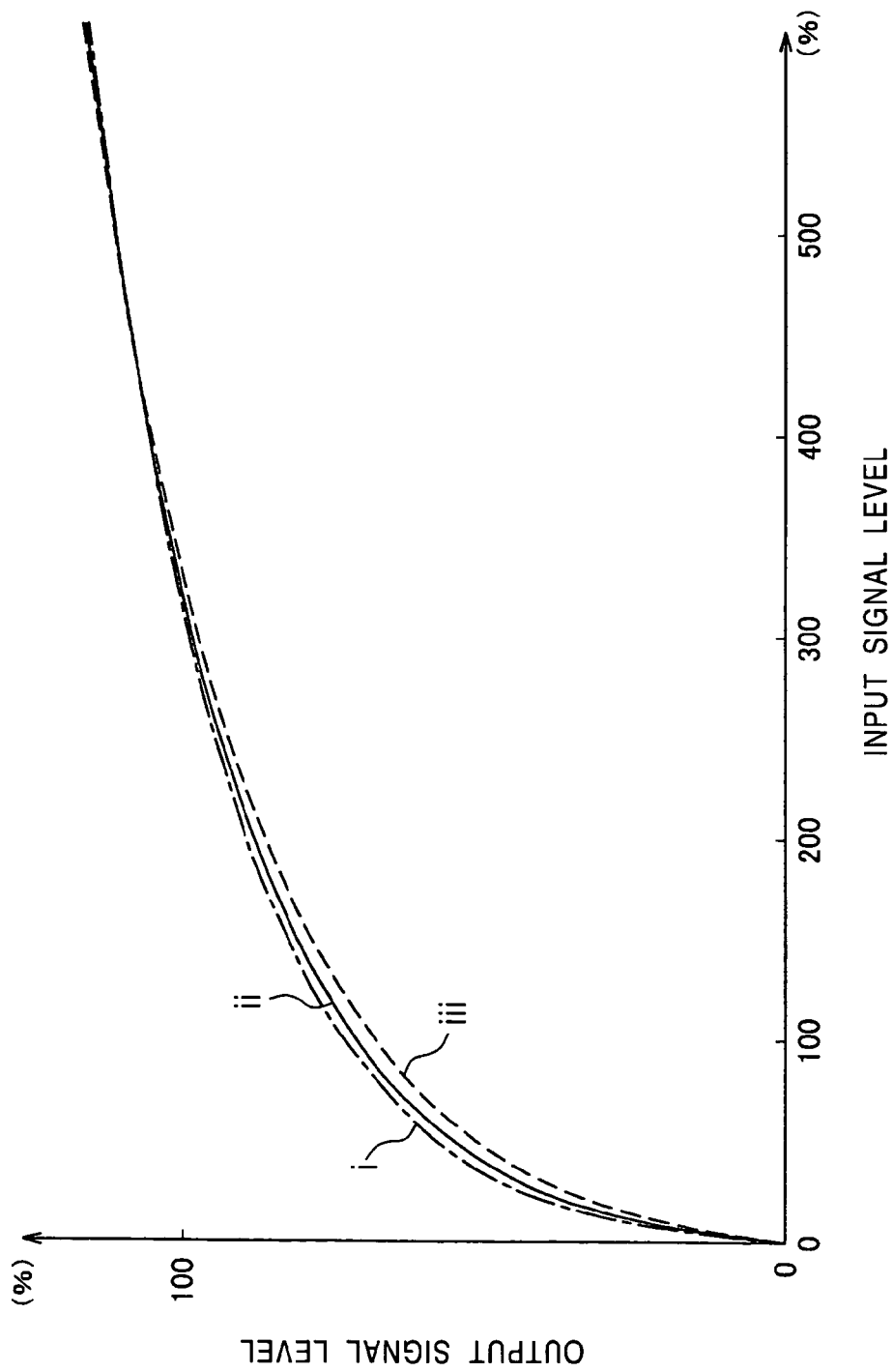
FIG. 3 is a graph including three correction curves composed of gently rising logarithmic curves of the present invention.
Figure 4:
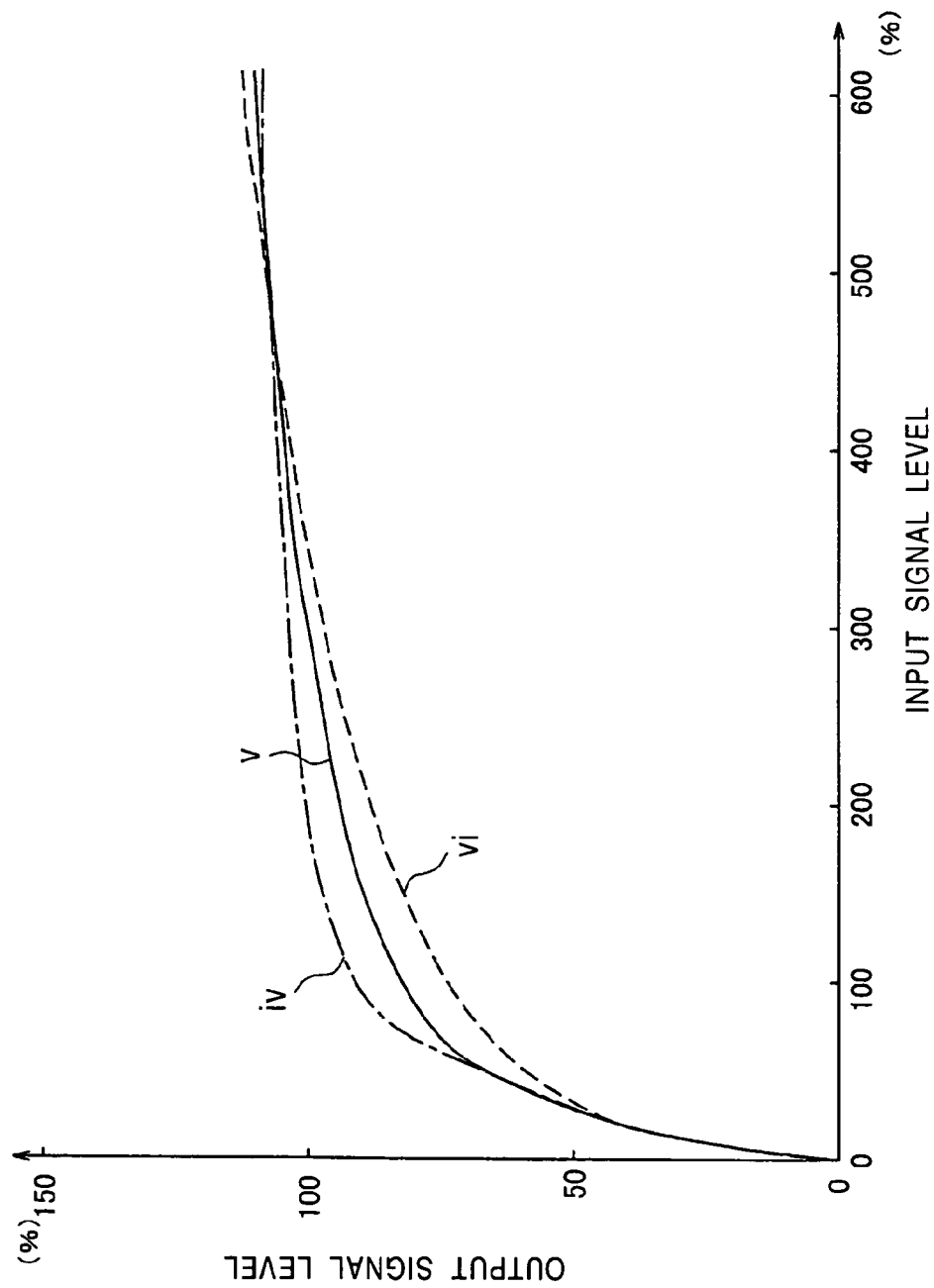
FIG. 4 is a graph including three correction curves composed of ITU-709 logarithmic curves of the present invention.

The correction curves according to the embodiment will now be described with reference to FIGS. 3 and 4. FIG. 3 is a graph including three correction curves composed of the gently rising logarithmic curves. FIG. 4 is a graph including three correction curves composed of the ITU-709 logarithmic curves.

(1) Gently Rising Logarithmic Curves (i) to (iii)

FIG. 3 is a graph including three correction curves composed of the gently rising logarithmic curves having the following slopes at the origin: (i) 5.0; (ii) 4.0; and (iii) 3.0. These gently rising logarithmic curves are represented by the following functions:

(i) the slope at the origin is 5.0

$$y=0.548576*\log 10(x+0.047649)+0.725190$$
$$(0.000000=<x<4.601600)$$

(ii) the slope at the origin is 4.0

$$y=0.584792*\log 10(x+0.063493)+0.700156$$
$$(0.000000=<x<4.601600)$$

(iii) the slope at the origin is 3.0

$$y=0.640217*\log 10(x+0.092681)+0.661350$$
$$(0.000000=<x<4.601600)$$

According to the embodiment, the correction curve is composed of the gently rising logarithmic curve whose slope at the origin is gentle (e.g. 5.0 or less). As a result, an image having no isolated black component and appearing normal to the viewer is displayed even on a conventional monitor, and thus, the image including information contained in the range exceeding 100% and having a quality equivalent to a film-based image is achieved. Additionally, varying the slope of the correction curve at the origin changes the quality of the black component in the lower level of the signal so that the range of the black component can be suitably adjusted even on a conventional monitor. The logarithmic curve may be designed depending on the extent to which information can be included in the range exceeding 100% (e.g. 108%).

(2) ITU-709 Logarithmic Curves (iv) to (vi)

The ITU-709 logarithmic curve according to the embodiment will now be described below with reference to FIG. 4. FIG. 4 is a graph including three correction curves. The correction curves have different levels of an input signal where the ITU-709 logarithmic curve is shifted from an ITU-709 characteristic curve segment to a logarithmic curve segment. Three levels of the input signal are: (iv) 70%; (v) 40%; and (vi) 10%. These ITU-709 logarithmic curves shown in FIG. 4 are represented by the functions described below.

The ITU-709 logarithmic curve (70%) indicates that the ITU-709 characteristic curve segment lies in the range up to 70% input signal level and the logarithmic curve segment lies in the range above 70% input signal level. With respect to the shift from the ITU-709 characteristic curve segment to the logarithmic curve segment, both curve segments are combined and have the same slope at, for example, 70% input signal level.

(iv) ITU-709 Logarithmic Curve (70%)

$$y=4.5*x(x<0.018054)$$

$$y=1.099297*x0.45-0.099297(0.018054=<x<0.7)$$

$$y=0.169566*\log 10(x-0.577651)+0.991703(0.7=<x)$$

(v) ITU-709 Logarithmic Curve (40%)

$$y=4.5*x(x<0.018054)$$

$$y=1.099297*x0.45-0.099297(0.018054=<x<0.4)$$

$$y=0.334032*\log 10(x-0.222835)+0.879619(0.4=<x)$$

(vi) ITU-709 Logarithmic Curve (10%)

$$y=4.5*x(x<0.018054)$$

$$y=1.099297*x0.45-0.099297(0.018054=<x<0.1)$$

$$y=0.514296*\log 10(x+0.027254)+0.751213(0.1=<x)$$

According to the embodiment, in the correction curve, the curve segment whose slope is gentle is assigned to the lower-level range of a signal (the range near the origin) and the logarithmic curve segment is assigned to the higher-level range of a signal. As a result, an image having no isolated black component and appearing normal to the viewer is displayed even on a conventional monitor, and thus, a displayed image including information contained in the range exceeding 100% and having a quality equivalent to a film-based image is achieved. The logarithmic curve segment may be designed depending on the extent to which information can be included in the range exceeding 100% (e.g. 108%). Moving the level where the correction curve is shifted from the ITU-709 characteristic curve segment to the logarithmic curve segment results in the selection of which level is emphasized, the lower or the higher one. Specifically, the length of the logarithmic curve segment increases with a decrease in the level of the input signal of the shifting, thus increasing the amount of included information. This means that the higher-level range is emphasized. By contrast, the length of the ITU-709 characteristic curve segment increases with an increase in the level of the input signal of the shifting. This means that the lower-level range is emphasized.

While the preferred embodiments of the present invention have been shown and described, the present invention is not limited to these embodiments. It is apparent to those skilled in the art that changes and modifications may be made therein without departing from the sprit of the present invention or from the scope of the appended claims.

For example, although three correction curves composed of the gently rising logarithmic curves having the slopes of 5.0, 4.0, and 3.0 have been described above, other logarithmic curves are applicable as long as the slope is 5.0 or less.

Although three correction curves composed of the ITU-709 logarithmic curves having the levels of the input signals where the correction curve is shifted from the ITU-709 characteristic curve segment to the logarithmic curve segment of 70%, 40%, and 10% have been described above, the level of the input signal may be set freely, depending on the selection of which level is emphasized, the lower level or the higher level.

Although output video signals under the NTSC system have been described above, the output signals may be under the PAL system.

What is claimed is:

1. A gamma correction device in an image capturing apparatus, the gamma correction device performing gamma correction on a video signal from an image capturing element on the basis of at least one correction curve having a predetermined input-output characteristic, wherein said at least one correction curve has a slope of 5.0 or less at the origin such that a corrected video signal conforms to film properties, wherein said at least one correction curve is of the form $Signal_{OUT} = a * \log_{10}(Signal_{IN} + b) + c$.

2. The gamma correction device in the image capturing apparatus according to claim 1, wherein the slope of said at least one correction curve at the origin is settable based on various conditions.

3. The gamma correction device in the image capturing apparatus according to claim 1, wherein said at least one correction curve comprises a plurality of correction curves having different slopes and being selectable based on various conditions.

4. The gamma correction device in the image capturing apparatus according to claim 1, wherein the image capturing apparatus is a video camera.

5. The gamma correction device in the image capturing apparatus according to claim 1, wherein said at least one correction curve has a slope of between 1.0 and 5.0 at the origin, indicates an output level less than 100% when the input level is less than 200%, indicates an output level of at least 100% when the input level is greater than 400%.

6. The gamma correction device in the image capturing apparatus according to claim 1, wherein said at least one correction curve has a slope of between 1.0 and 5.0 at the origin, indicates an output level less than 100% when the input level is less than 300%, indicates an output level of at least 100% when the input level is greater than 350%.

7. A gamma correction device in an image capturing apparatus, the gamma correction device performing gamma correction on a video signal from an image capturing element on the basis of at least one correction curve having a predetermined input-output characteristic, wherein said at least one correction curve comprises a composite of a first correction curve segment lying from the origin to a predetermined level of an input signal such that a corrected video signal conforms to a cathode-ray tube monitor and a second correction curve segment lying above the predetermined level of the input signal such that the corrected video signal conforms to film properties, and both correction curve segments are continuously combined and have the same slope at the predetermined level of the input signal, and wherein said second correction curve segment is of the form $Signal_{OUT} = a * \log_{10}(Signal_{IN} + b) + c$.

8. The gamma correction device in the image capturing apparatus according to claim 7, wherein the predetermined level of the input signal is settable based on various conditions.

9. The gamma correction device in the image capturing apparatus according to claim 7, wherein said at least one correction curve comprises a plurality of correction curves having different predetermined levels of the input signals and being selectable based on various conditions.

10. The gamma correction device in the image capturing apparatus according to claim 7, wherein the image capturing apparatus is a video camera.

11. The gamma correction device in the image capturing apparatus according to claim 7, wherein said at least one correction curve has a slope of between 1.0 and 5.0 at the origin, indicates an output level less than 100% when the input level is less than 150%, indicates an output level of at least 100% when the input level is greater than 350%.

12. The gamma correction device in the image capturing apparatus according to claim 7, wherein said first correction curve segment corresponds to the ITU-709 characteristic curve.

* * * * *